United States Patent [19]

Chang

[11] Patent Number: 5,301,912
[45] Date of Patent: Apr. 12, 1994

[54] ADJUSTABLE AND MOVABLE HOOK STRUCTURE

[76] Inventor: Shou-Hwa Chang, P.O. Box 96-405, Taipei 10098, Taiwan

[21] Appl. No.: 962,248

[22] Filed: Oct. 16, 1992

[51] Int. Cl.$^5$ .............................................. F16B 45/00
[52] U.S. Cl. ........................... 248/221.3; 248/224.3; 248/298; 248/304; 403/328; 403/361
[58] Field of Search .................. 248/224.3, 225.2, 298, 248/304, 231.9, 231.91, 221.3, 307; 403/328, 360, 361, 375

[56] References Cited

U.S. PATENT DOCUMENTS

| | | | |
|---|---|---|---|
| 814,020 | 3/1906 | Clifford | 403/328 X |
| 1,269,413 | 6/1918 | Finnigan | 403/328 X |
| 2,202,811 | 6/1940 | Carney et al. | 248/298 X |
| 2,501,752 | 3/1950 | Ambrosius | 248/298 X |
| 3,045,832 | 7/1962 | Hibbard | 248/304 X |
| 3,174,628 | 3/1965 | Kirch, jr. | 248/224.3 X |

FOREIGN PATENT DOCUMENTS 117961 2/1927 Switzerland ..................... 248/304

*Primary Examiner*—David A. Scherbel
*Assistant Examiner*—Derek J. Berger

[57] ABSTRACT

An adjustable and movable hook, which comprises a base block, a click stop assembly and a hook stem; the front side of the base block has a round rod hole for receiving the hook stem; a screw hole is furnished on the top side of the base block, being in communication with the round rod hole. One side of the hook stem (i.e., the side which faces the screw hole) has a groove side, which includes a plurality of positioning grooves and guide flats. The front end of the hook has a hook-shaped section, while the rear end thereof has a round stub. The hook stem can be pulled back and forth in the round rod hole to adjust the hook stem in a length desired by means of a click stop assembly, which has a spring and a positioning ball for providing a resilient and click effect to the hook stem.

3 Claims, 3 Drawing Sheets

ADJUSTABLE AND MOVABLE HOOK STRUCTURE

BACKGROUND OF THE INVENTION

1. Field of the Invention:

This invention relates to a hook, and particularly to a hook which is to be placed on the flat top of a fireplace, and which can be pulled back and forth in a length desired.

2. Description of the Prior Art:

Generally, the conventional hook to be placed on fireplace during Christmas season has a base block and a hook for hooking a Christmas sock. In Christmas eve, the parents usually encourage the children to go to bed early so as to let the Santa Claus bring gift during the mid-night and put in the Christmas sock; otherwise, the Santa Claus would not put gifts in the Christmas sock according to the nursery tale. Usually, the parents would put some gifts in the Christmas sock in mid-night in accordance with children's hope.

The conventional hook to be placed on a fireplase as shown in FIG. 7 usually comprises a weighted base 31, of which the middle bottom has a dovetail groove to receive a dovetail-shaped guide block 33. The front end of the guide block 33 is mounted with a hook-shaped section 32. The bottom of the dovetail-shaped guide block 33 is furnished with an adjustable guide groove 35 for receiving a screw 34 fixed on the base block 31. After the screw 34 being loosened, the guide block 33 can be pulled out for adjustment so as to hook a Christmas sock at a suitable position.

Another conventional hook structure for fireplace as shown in FIG. 8 comprises a weighted base block 36, of which the front side is fixed with a hook-shaped section 37. The hook can be placed on a fireplace for hooking a Christmas sock; however, such hook structure is unable to adjust the length thereof.

Still another conventional hook structure for fireplace as shown in FIG. 9, which comprises a weighted base block 39 with a round rod hole 43 in the front side thereof, a screw hole 44 to receive a screw 45 on the bottom side thereof being in communication with the round rod hole 43, and a hook stem 40 of which one end has a round rod 42 to be inserted in the round rod hole 43. Before the screw 45 is fixed in place, the hook stem 40 can be adjusted in a length desired; the front hook-shaped section 41 is used for hooking a Christmas sock.

The aforesaid hook structures as shown in FIGS. 7 and 9 are usually used for hooking Christmas socks. When the hook-shaped section is pulled out for adjustment, the base block must be removed from a fireplace first before adjusting the fixing screw with a tool; such a way of adjustment is deemed inconvenient to a user.

SUMMARY OF THE INVENTION

The prime feature of the present invention is the base block thereof, which is a weighted block with a round rod hole for receiving a hook stem. The top side of the hook stem has a groove side, which includes a plurality of positioning grooves and guide flats so as to provide a positioning function after the hook stem being pulled in a given length.

Another feature of the present invention is that the front side of the base block has a round rod hole, and the top of the base block has a screw hole, being in communication with the round rod hole; the screw hole is to receive a click stop assembly, which includes a positioning ball, a spring and a screw; by means of the close contact between the positioning ball and the groove side, the hook stem can be retained at a position desired after being pulled out.

Still another feature of the present invention is that the screw in the click stop assembly has a spring hole to receive a spring, of which one end is in contact the positioning ball. After the click stop assembly is fitted in the screw hole in the base block, the pressure of the spring can be adjusted so as to adust the pressure of the positioning ball to be applied to the hook stem.

A further feature of the present invention is that one end of the hook stem has a hook-shaped section, while the other end thereof is a round stub with a vertical stop. By means of the click stop assembly and the vertical stop, the hook stem would not be pulled out of the base block upon the hook stem being pulled back and forth for adjustment of length.

DETAILED DESCRIPTION OF THE PREFERRED EMBODIMENTS

Figure 1:
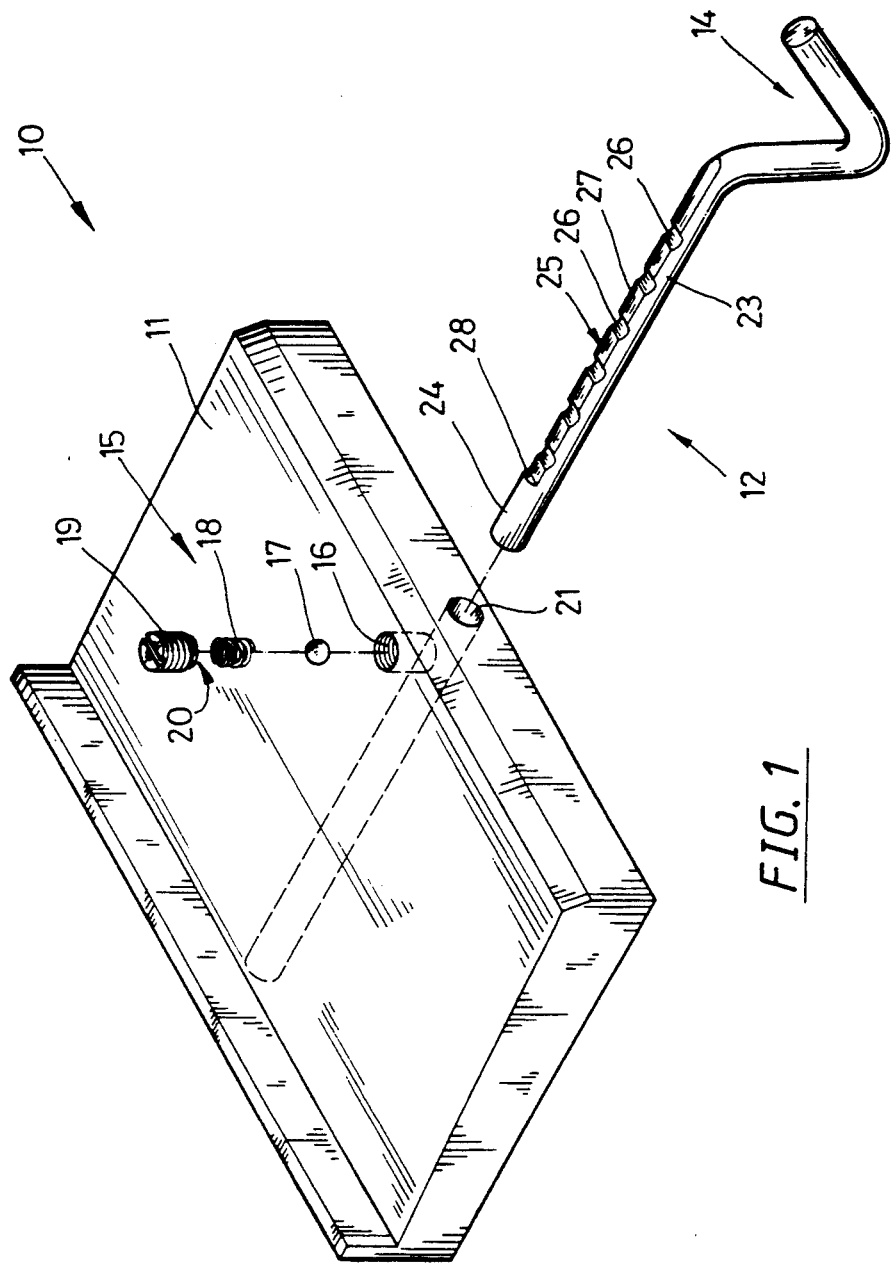
FIG. 1 is a disassembled view of an embodiment according to the present invention.
Figure 2:
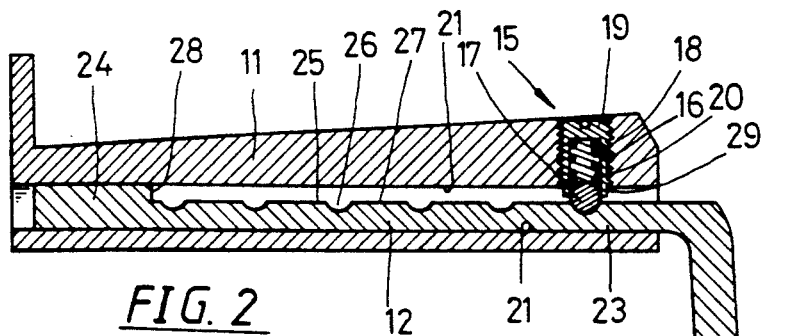
FIG. 2 is a sectional view of the present invention, showing the position of a hook in a base block.
Figure 3:
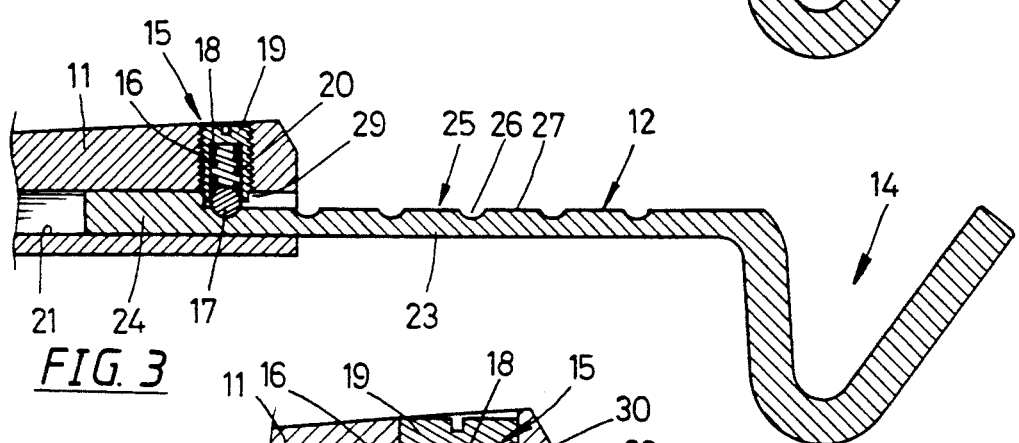
FIG. 3 is a fragmental section view of the present invention, showing the hook being pulled out of a round rod hole in the base block.

Referring to FIGS. 1 to 3, the hook 10 to be attached to a fireplace comprises a base block 11, a hook stem 12, and a click stop assembly 15. The hook 10 can be put on any spot on the flat top of a fireplace by means of a weighted base block 11, of which the front side has a round rod hole 21 for receiving the hook stem 12. The front end of the hook stem 12 has a hook-shaped section 14 for hooking a Christmas sock.

The hook stem 12 is substantially a solid round rod, of which one end is bent into a hook-shaped section 14 for hooking a Christmas sock. The top side of the round rod 23 is provided with a groove side 25 which includes a plurality of positioning grooves 26 and guide flats 27 arranged regularly one another; the other end of the round rod is a round stub 24 with a vertical stop 28 forming an end of the groove side 25.

The base block 11 is substantially a square slab, being cast with a metal into shape or made of other materials; the front side of the base block 11 has a horizontal round rod hole 21 for receiving one end of the hook stem 12.

The front section of the round rod hole 21 is furnished with a screw hole 16 being perpendicular to and in communication with the round rod hole 21; the screw hole 16 is to mount a click stop assembly 15 therein.

The click stop assembly 15 includes a positioning ball 17, a spring 18 and a screw 19. The screw 19 is furnished with outer threads to be engaged with the screw hole 16 in the base block 11. The screw 19 has a spring hole 20 for receiving the spring 18. One end of the spring 18 is mounted with a positioning ball 17.

The whole structure of the hook 10 is further described as follows: The round rod 23 part of the hook stem 12 is to be inserted in the round rod hole 21 on the front side of the base block 11; the hook stem 12 has a groove side 25, on which a plurality of positioning grooves 26 and guide flats 27 are furnished and arranged regularly; all the grooves 26 and the guide flats 27 are facing up in the screw hole 16 direction. The screw hole 16 is loaded with the click stop assembly 15 so as to have the positioning ball 17 closely contacted with the groove side 25. Since the positioning ball 17 is pressed with the spring 18, the positioning ball 17 always exerts a pressure on the groove side 25. Such a pressure will cause the positioning groove 26 on the hook stem 12 to have a positioning and stop function upon the hook being pulled back and forth.

After the hook stem 12 and the click stop assembly 15 are mounted in the base block 11, the positioning ball 17 of the assembly 15 will rest on the groove side 25; when the hook-shaped section 14 is pulled to a suitable position, the positioning ball 17 will move along a guide flat 27 between two positioning grooves 26 as a result of the pressure of the spring 18, and then the ball 17 stop and rests in one positioning groove 26 to retain the hook in place.

Since the base block 11 has been weighted properly, it can be placed at any spot on the flat top of a fireplace. The hook-shaped section 14 of the hook can extend out of the front edge of the base block 11 in a length desired by appropriate adjustment for hooking a Christmas sock. The position of the hook-shaped section 14 can be adjusted by pulling back and forth as shown in FIG. 2. When the hook-shaped section 14 is pulled to move, the positioning ball 17 will move along the positioning groove 26 and the guide flats 27 until the hook-shaped section 14 being extended in a length desired.

In order to prevent the hook stem 12 from pulling out of the round rod hole 21 completely, a vertical stop 28 is furnished between the round stub 24 and the groove side 25. A flange part 29 is also furnished on the opening of the screw 19 to be engaged with the vertical stop 28 for actually stopping the hook stem 12 to be pulled out completely.

Figure 6:
FIG. 6 is a fragmental section view of the present invention, showing still another type of screw in the click stop assembly.
Figure 7:
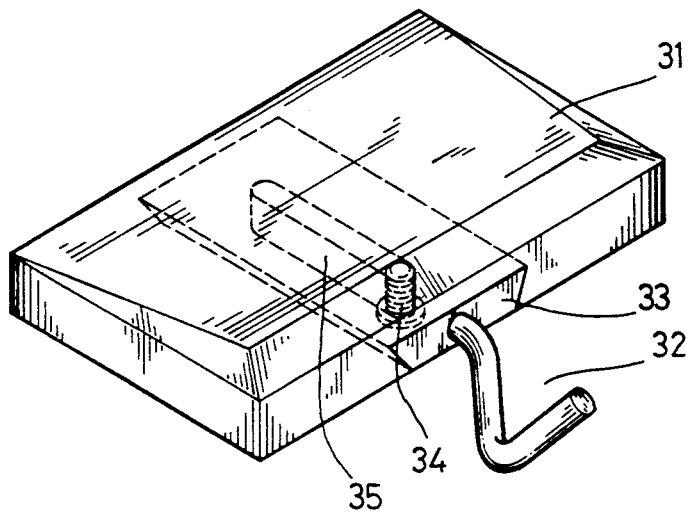
FIG. 7 is a perspective view of a well-known hook structure.
Figure 8:
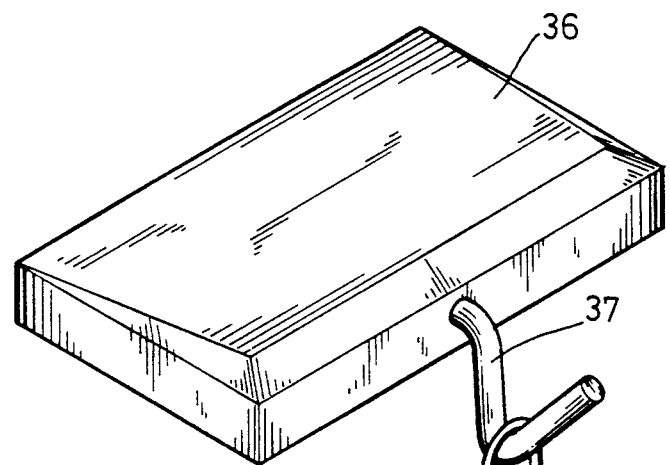
FIG. 8 is a perspective view of a well-known hook being used for hooking a sock.
Figure 9:
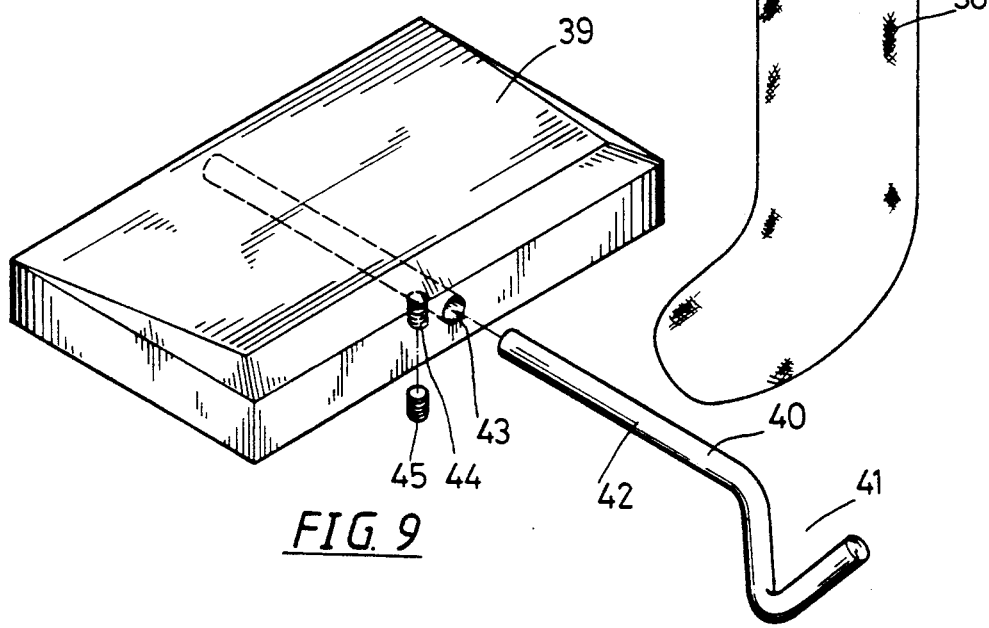
FIG. 9 is a perspective view of a well-known hook structure, being disassembled.

Another structure is furnished as shown in FIG. 6 to facilitate the hook stem 12 to be pulled out of the round rod hole 21; in such structure, the height between the guide flat 27 of the hook stem 12 and the inner wall of the round rod hole 21 must be equal to or larger than the radius of the positioning ball 17; in that case, the positioning ball 17 would not stop the vertical stop 28 upon the hook stem 12 being pulled in the direction of the spring hole 20.

According to the structure of the present invention, the hook stem 12 can be inserted into the round rod hole 21 in the base block 11; the groove side 27 of the hook stem 12 is provided with positioning grooves 26 and guide flats 27, which can be assembled together with the click stop assembly 15 in the base block 11 to facilitate the hook stem 12 to be pulled back and forth. By means of the groove side 25 and the vertical stop 28 on the round stub 24, the hook stem 12 would not be pulled out of the round rod hole 21 completely upon the hook stem 12 being pulled back and forth under normal adjustment.

Figure 4:
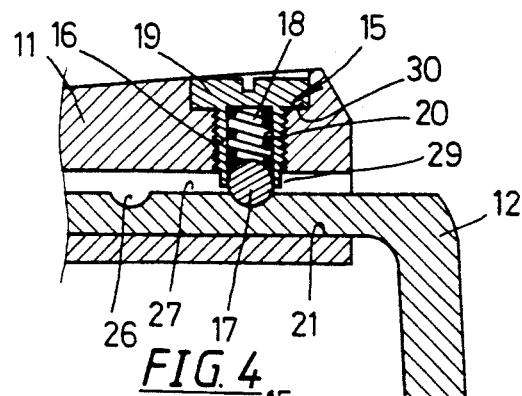
FIG. 4 is an enlarged fragmental section view of the present invention, showing a screw in a click stop assembly in the base block.
Figure 5:
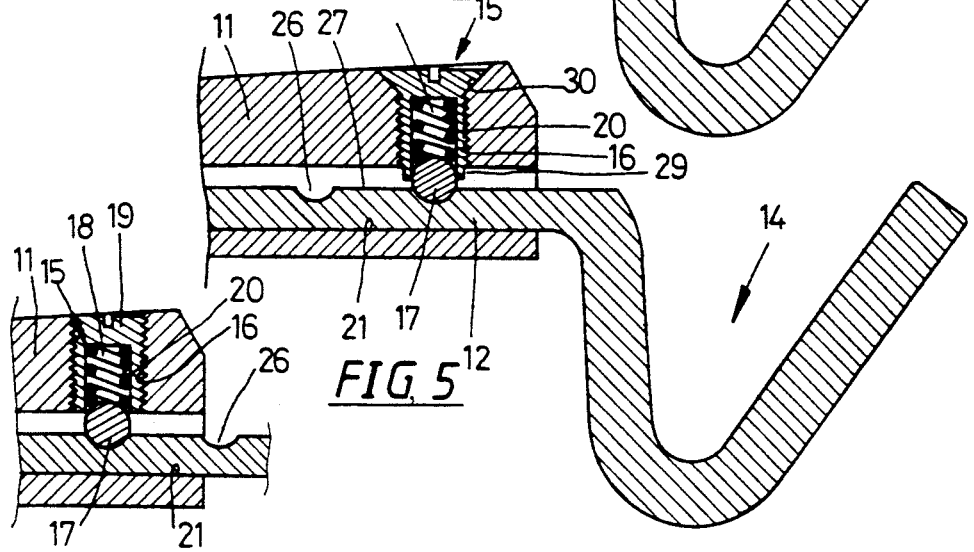
FIG. 5 is an enlarged fragmental section view of the present invention, showing another type of screw in the click stop assembly.

In the click stop assembly 15, the screw 19 is a headless screw to be mounted in a screw hole 16 in the base block 11. The screw 19 can be set in place with a tool; as shown in FIG. 4, the screw 19 is a flat head screw; FIG. 5 illustrates a flat-and-conic head screw, which can be screwed in until the screw being stopped with the stop edge 30. Since the flange part 29 in front of the screw 19 in the click stop assembly 15 can directly stop the vertical stop 28 of the hook stem 12, the stem 12 would not be pulled out of the round rod hole 21 of the base block 11; the spring 18 can also provide a pressure to the groove side 25 for producing a positioning function.

According to the aforesaid embodiments of the present invention, effective improvements for the conventional hook for fire-place have been made in respect to practical use and novel structure.

I claim:

1. An adjustable and movable hook structure comprising:
   a base block being a thick slab with a top side and a front side and having a round rod hole on the front side thereof, and having a screw hole on the top side adjacent the front side; said screw hole being in communication with said round rod hole;
   a hook stem having a front end and a rear end;
   a click stop assembly being mounted in said screw hole to be engaged with said hook stem so as to provide said hook stem with a positioning function; and
   said hook structure characterized in that said hook stem being a solid round rod to fit in said round hole of said base block; the front end of said hook stem having a hook-shaped section; said hook stem having a groove side which including a plurality of positioning grooves and guide flats; the rear end of said hook stem being a round stub to fit in said round rod hole; a vertical stop being furnished between said round stub and said groove side.

2. An adjustable movable hook structure as claimed in claim 1, wherein said click stop assembly comprises a positioning ball and said guide flats on said groove side of said hook stem provide a space under the inner wall of said round rod hole, said space being at least equal to the radius of the positioning ball of said click stop assembly.

3. An adjustable and movable hook structure as claimed in claim 1, wherein said hook stem has a vertical stop between said round stub and said groove side said click stop assembly comprising a screw having a flange part extended slightly downwards into said space above said groove side.

* * * * *